Figure 1:
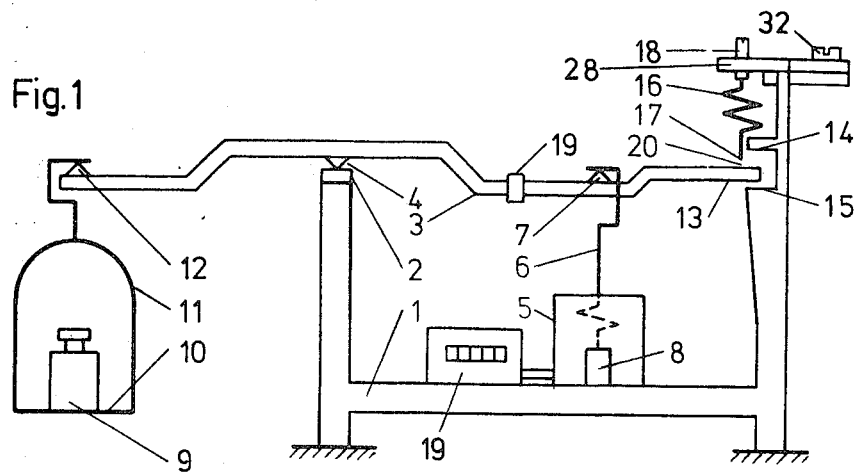

United States Patent [19]

Wirth

[11] 3,967,691

[45] July 6, 1976

[54] MASS AND FORCE MEASURING INSTRUMENT

[75] Inventor: Armin Wirth, Zurich, Switzerland

[73] Assignee: Wirth, Gallo and Company, Switzerland

[22] Filed: Aug. 13, 1974

[21] Appl. No.: 496,953

[30] Foreign Application Priority Data
Nov. 16, 1973 Switzerland.................. 16253/73

[52] U.S. Cl. .................................................. 177/230
[51] Int. Cl.² ........................................... G01G 23/26
[58] Field of Search ................... 177/225, 229, 230

[56] References Cited
UNITED STATES PATENTS

| | | | |
|---|---|---|---|
| 2,592,500 | 4/1952 | Williams | 177/164 |
| 2,681,566 | 6/1954 | Ruge | 177/225 UX |
| 3,647,010 | 3/1972 | Beardmore et al. | 177/230 |
| 3,709,310 | 1/1973 | Cooke et al. | 177/230 X |
| 3,807,517 | 4/1974 | Freeman | 177/229 X |

Primary Examiner—George H. Miller, Jr.
Attorney, Agent, or Firm—Stevens, Davis, Miller & Mosher

[57] ABSTRACT

In a mass and force measuring instrument comprising a load support, load-compensating means with very small travel, transmission elements transmitting a force depending on the load to the load-compensating means, display means, at least one linearizing spring whose force varies continuously and acts on the load-compensating means in a direction parallel to that of said force depending on the load, said linearizing spring being active only in a part of the measuring range and means to adjust the characteristic line of said spring.

4 Claims, 15 Drawing Figures

U.S. Patent  July 6, 1976  Sheet 1 of 3  3,967,691

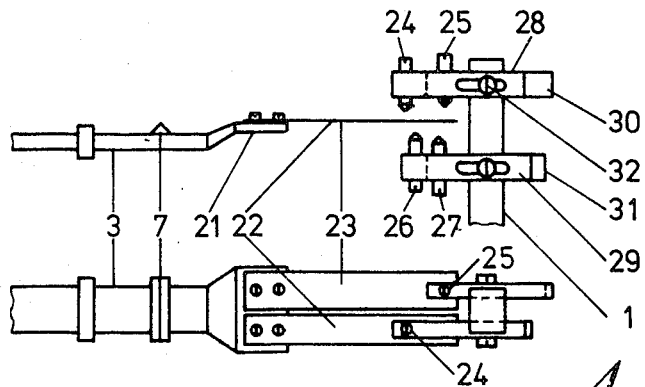
Fig. 5
Fig. 6
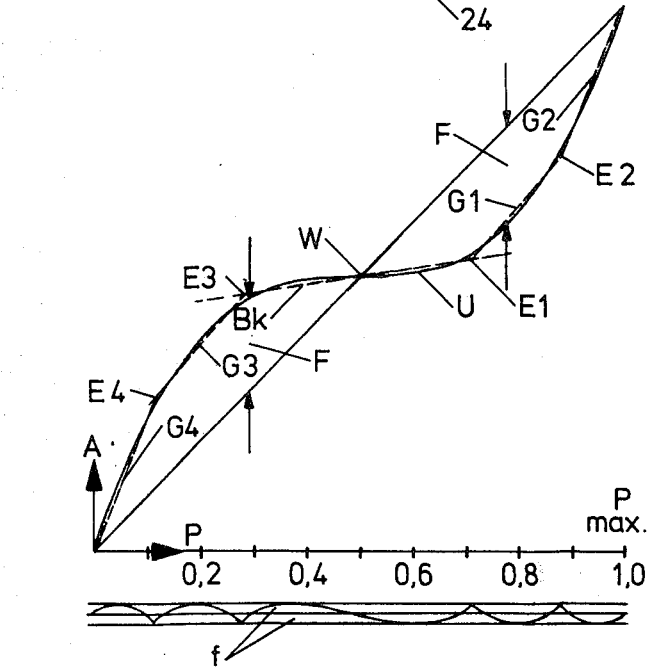
Fig. 7a
Fig. 7b
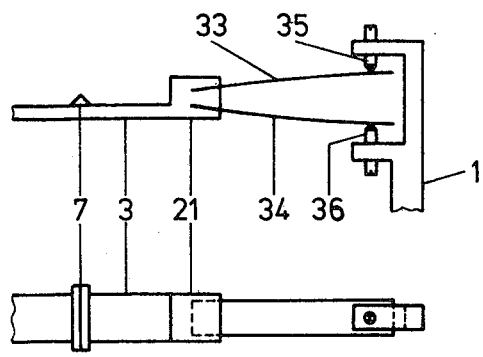
Fig. 8
Fig. 9

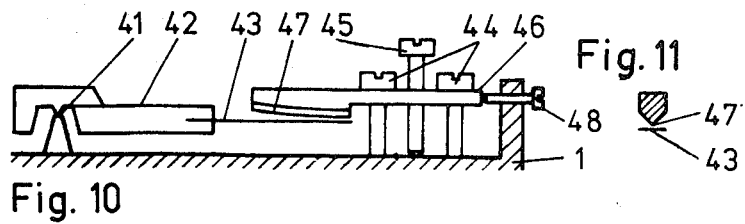
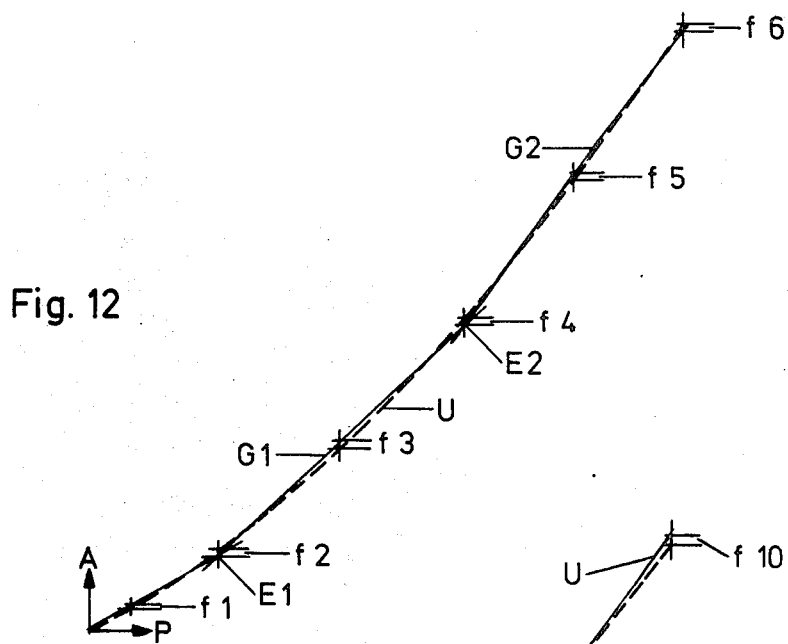
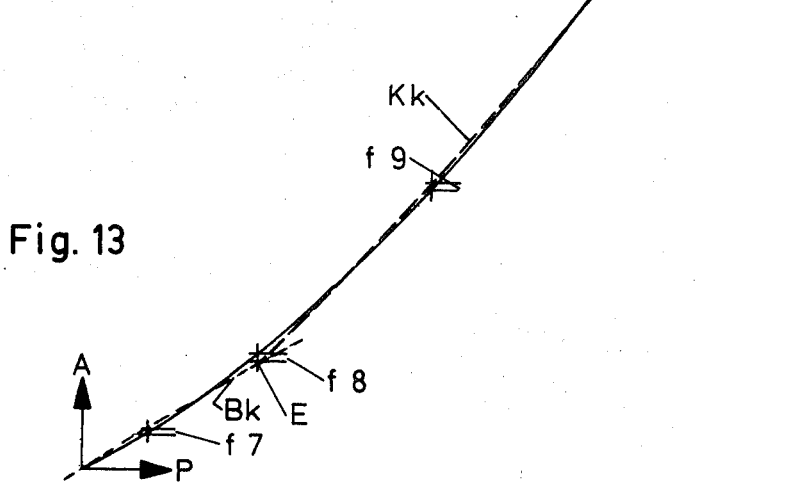

MASS AND FORCE MEASURING INSTRUMENT

The present invention relates to a mass and force measureing instrument with a load support, load-compensating means, transmission elements, which transmit a force depending on the load to the load-compensating means, a display device and at least one linearizing spring acting on the load-compensating means in the same direction as said force, and whose force varies continuously. Such instruments are known e.g. from DOS 2.219.727. Therein, to linearize the characteristic line of the device, a part of the force to be measured is deflected over resilient links mounted in parallel to the load-compensating means with a non-linear force — way characteristic. A linear spring is provided which is conveniently mounted with regard to the moving direction of the relevant transmission element. Such instruments may comprise load-compensating means of different type.

Mass and force measuring devices, wherein vibrating strings are used as load-compensating means, are known e.g. from the Swiss Pat. No. 447.653. Such instruments generally provide sufficiently linear results for normal demands. Furthermore, force-measuring devices with one single string, simple capacitive and inductive force-measuring devices, are also known. These have an absolutely unlinear indication, as inclination scales with edge-limited load-beam arms. Also in this case a characteristic line which is linear on the first approach can be obtained with various subsidiary means.

For high and very high needs for resolution and precision for both kinds of instruments, means are necessary to correct distortion and to linearize the load-indication characteristic line.

Where one part of the measuring cell is moved, under the influence of the increasing load, at least some mm up to some cm or more, linearizing means are known. For instance, over the whole measuring range, a non-linear spring is applied directly in a linear way or a linear spring is applied in an unlinear way on an element moved by the force to be measured.

It is also known, e.g. from the German Pat. No. 2,203,790, to vary under the influence of the force to be measured the arm length of a lever mounted in the measuring cell. Furthermore it is known to provide magnets whose force-distance ration is non-linear and to let them act upon the moving element.

The electronic digital correction of the load indication characteristic lines of scales with one or two vibrating strings or of other direct digital systems is possible, but even if electronic adjustment means for this correction are not provided, it is very expensive. Because the parameters of the corrective calculation need to be adjustable, the use of electronic means known today would make such a scale uneconomic.

The principle of operation of the other linearizing devices mentioned as based on a superimposition, extending over the whole measuring range, of the non-linear weighing or force-measuring characteristic line with a reversely non-linear correction line, in such a manner that to the original characteristic line the necessary deficiency or surplus is supplied, by which, within the limits demanded, a linear characteristic line is obtained.

A further disadvantage of all known correction devices is the fact that with one element the entire correction has to be mastered. Because of this, non-linear springs with certain characteristics or a magnet armature of a very precise form are employed, which make the adjustment possibilities difficult or limits them very much.

It is the purpose of the present invention to provide linearization of the characteristic line of mass- and force-measuring instruments by approximating the theoretical correction line by means of a sufficiently accurate polygonal line. According to the invention this is achieved by providing at least one linearizing spring which works only in a part of the measuring range.

Figure 2:
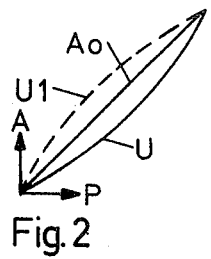
Figure 3:
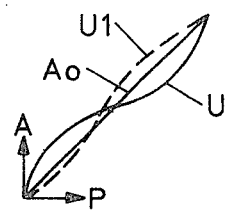

In the accompanying drawings embodiments of the invention are represented schematically, wherein:

FIG. 1 shows a first embodiment,
FIGS. 2–4 show the graphical representations,
FIGS. 5–6 show a variant of the linearizing spring,
FIGS. 7a,7b show the relative graphical representation,
FIGS. 8,9 show a second variant of the linearizing spring,
FIGS. 10,11 show a third variant of the linearizing spring,
FIGS. 12,13 show graphical representations of further linearizing possibilities.

The scale represented in FIG. 1 has a frame 1 with a bearing 2. A beam 3 is mounted on bearing 2 by means of a knife edge 4. A measuring cell 5 of known construction is fixed to frame 1. It is connected with beam 3 by means of a transmission bar 6 and a knife edge 7. This measuring cell 5 comprises load-compensating means 8. Also these load-compensating means 8 are of known construction. They can consist, for instance, of swing-out weights, of vibrating strings or similar. In any case the disposition is so that, putting the load 9 on the load support 10, beam 3 tilts by a certain amount until it reaches its equilibrium position. The load support 10 is suspended on beam 3 by means of a bridle 11 on a knife edge 12. In the embodiment shown the knife edges 7 and 12 are equidistant from the knife edge 4, so that the force acting upon the load-compensating means 8 is equal to the weight of the load 9. Of course, this weight could also be transmitted to the load-compensating means 8 by a multiplying or a reducing transmission. In any case the force acting on the load-compensating means 8 is a function of the load to be measured. This force can be proportional to this load, but very frequently the transmission means are of such a kind that it cannot remain proportional to the load over the whole measuring range. The other end 13 of the beam 3 is placed between two stops 14, 15 of the frame 1. A linearizing spring 16 whose end 17 can come into contact with the end 13 of beam 3 is mounted on a movable slide 28 which can be adjusted and set by means of a screw 18. The vertical position of the linearizing spring 16, i.e. its point of action, can be adjusted by means of the screw 18. The horizontal adjustment of the slide 28 moves the point of action of the linearizing spring 16 and consequently the transmission ratio with which its force acts upon the measuring cell 8. With an unloaded load support 10, there is play 20 between the end 13 of beam 3 and the end 17 of the linearizing spring 16. Furthermore, a display device 19 is disposed on the frame 1. It is controlled by the measuring cell 8 and can indicate digitally the mass of the load 9.

The scale described works as follows. FIGS. 2 and 3 show typical, non-linear indications $U$, $U_1$ of measuring cells. The indicated result is represented as the ordinate and the measuring force as the abscissa. Indications according to curves U are called positive linearity errors, broken-line curves $U_1$ are called negative linearity errors. Indications like the straight line $A_o$ would be linear indications without error. Measuring cells with indications like FIG. 2 present (at least in first approximation) square linearity errors, those with indications U, $U_1$ like FIG. 3 present (at least in first approximation) cubic linearity errors. The last ones may be symmetrical (solid line) or unsymmetrical (broken line). Combinations of both square and cubic linearity errors and those of higher order are possible. The correction of such errors does not differ fundamentally from the correction of purely square and purely cubic errors.

Figure 4A:
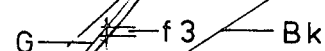
Figure 4B:
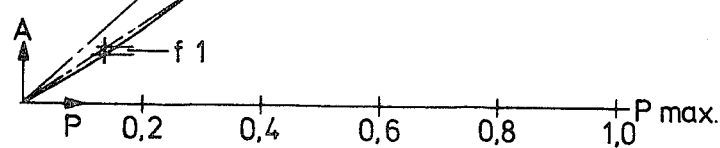

Curve U in FIG. 4a shows the uncorrected indication of a measuring cell with square linearity errors. Since all measuring cells are directly or indirectly adjustable relative to their neutral position and to their measuring range, it is possible to draw a reference line $B_m$ or $B_k$ as high and as steep as desired. It can be drawn e.g. as a tangent to the zero point of the indication curve or as a chord between zero and maximum indication (both not shown). Preferably the reference line $B_m$ has to be drawn in such a manner that the relative maxima $F_1$ and $F_2$ are favorably positioned in a usual tolerance field as admitted by official rules. In FIG. 4b this tolerance field T is shown, as well as the linearity variations $F_1$ and $F_2$ from the reference line $B_m$. As shown, the linearity variations exceed the width of the tolerance field T considerably on both sides, i.e. such a device would not be accepted.

To achieve linearization, instead of the arbitrary reference line $B_m$, a new appropriate reference line $B_k$ is drawn, in such a manner that it intersects the indication curve, besides the zero point, at approximately 0.3 P, P being the maximum load. From this results a new linearity variation $f_1$. When the load reaches approximately 0.4 P, a new variation $f_2$ is provided. If the linearizing spring 16 (FIG. 1) is suitably adjusted, this load corresponds to the point where the end 17 of spring 16 comes into contact with the end 13 of beam 3. At further increase of the load, the linearizing spring 16 is working (point $E_1$ in FIG. 4a). It acts parallel to the force corresponding to the load which acts upon the measuring cell 8. The effect of this linearizing spring 16 prevents the indication curve from ascending too steeply. The position of the point of action $E_1$ can be adjusted by means of screw 18.

Figure 4C:
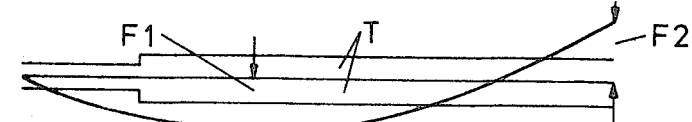

The effect of this arrangement can be theoretically deduced from FIGS. 4a and 4c. A straight line G crossing the point of action $E_1$ is imagined, which gives the best fit to the rest of the indication line U. For this remaining part of the curve there are two variations to the line G, i.e. $f_3$ and $f_4$. If the characteristic line of the linearizing spring to be inserted is chosen adequately, the line G (and with it the remainder of the indication curve U remaining on the right of the point of action $E_1$) is turned around the point of action $E_1$ until it covers the reference line $B_k$. Now $f_1$ to $f_4$ represent the new linearity variations from the reference line $B_k$. They are represented as ordinates in FIG. 4c, together with the tolerance field T admitted by the official rules.

It is evident that after single-step action of only one linear spring in a part of the measuring range the linearity variations cover only about half the width of the tolerance field T. Instead of the two original large variations $F_1$ and $F_2$ (FIGS. 4a and 4b) now there are four variations $f_1$ to $f_4$ (FIG. 4c) remaining which are five times smaller.

In the following figures variant embodiments of the linearizing springs are schematically illustrated.

FIGS. 5, 6 represent a variant in horizontal and upright projection, wherein two leaf springs 22, 23 serving as linearizing springs are mounted at the end 21 of beam 3. To each of these springs is associated a pair of stop screws 24, 26 and 25, 27. Each of these stop screws is assembled on a slide 28, 29, 30 and 31 respectively. The position of these slides 28–31 is adjustable and can be set by means of a screw 32. This arrangement serves to correct positive cubic errors with four points of action $E_1$ to $E_4$ (FIG. 7a); besides the position of these points of action also the characteristic line of the spring for each correction range is adjustable.

At half load the springs 22, 23 are, as drawn, in the middle between the respective stop screws 24–27. The adjustment is carried out as follows: With the means provided for this purpose, the slope of the curve is adjusted in such a manner that it corresponds to the reference line $B_k$, FIG. 7a, i.e. that it intersects the indication curve U at approximately 0.31 P and 0.64 P. Then, proceeding from the half load, the part up to the full load is corrected: The point of action $E_1$ is adjusted by the screw 24, i.e. at approximately 0.72 P. From these points on in direction of the full load the spring 22 becomes effective, i.e. it acts against the overproportional indication in direction of the full load. If the characteristic line of the spring is too flat in relation to the correction line $B_k$, the slide 28 and with it the screw 24 are moved to the right until the characteristic line of the spring presents the right course, i.e. until the correction line $G_1$ is in the position drawn in FIG. 7a, i.e. until it intersects the indication curve U at approximately 0.75 P and 0.86 P. Then the screw 25 is adjusted so as to come in contact with spring 23 at 0.89 P. When the load increases, it acts against a new overproportional indication. Then, if necessary, the slide 30 and with it the screw 25 are moved adequately, so that, together with the spring 22, it places the correction line $G_2$ into the right position relative to the part of the curve U, i.e. it intersects the latter at 1.0 P. The correction from half load to zero load is carried out in a symmetrical way to the half load point. It is characteristic for this embodiment that in the central indication range there is no spring in action, then towards zero and toward maximum indication on each side first one spring, then an additional spring becomes effective. In the case of non-symmetrical indication errors the disposition could also be non-symmetrical, i.e. it could present only one spring for the lower range and two springs for the upper one.

FIGS. 8 and 9 show in upright and horizontal projection an embodiment suitable to correct negative cubic indication errors ($U_1$ in FIG. 3). In this case the central part of the curve is the steepest one, with overproportional characteristics, while the following parts are less steep. On the right end 21 of beam 3 two straight leaf springs 33, 34 are mounted as linearizing springs. They are pre-tensioned by two screws 35, 36 fixed on frame 1 and therefore inflected as shown. In the whole preload range the sum of the two spring forces acts against the measuring force according to the characteristic lines of the springs.

With the load on the load support 10 increasing, beam 3 moves upwards bending the spring 33 until the spring 34 is extended and is no longer in contact with screw 36. The upward movement continuing, only spring 33 remains effective. On the contrary, when beam 3 moves downwards, after extension of spring 33, only spring 34 remains effective.

FIGS. 10 and 11 show schematically an embodiment with a spring with non-linear characteristics. At the end 42 of beam 3, which is mounted on a knife edge 41, a leaf spring 43 is fixed. A plate 46 is fixed to the frame 1 by means of two pulling screws 44 and one pushing screw 45, it bears a knife-shaped stop edge 47. In the zero position of the measuring cell there is play between the stop edge 47 and the leaf spring 43. When the end 42 moves upwards under the effect of the load, the leaf spring 43 comes into contact with the stop edge 47. With continuing movement, there is a deformation of this leaf spring 43 whose reaction on the end 42 is not linear because the effective length of the leaf spring 43 and with it the moment exercised by it on the end 42 varies. The radius of curvature of the stop edge 47 is preferably precalculated, but the point of action and the steepness of the correction are adjusted by means of the screws 44 and 45. Thus the linearizing spring cooperates with a knife-shaped stop, the point of contact moving as a function of the load. The non-linear effect of the leaf spring 43 is created by the fact that this straight, by itself linear leaf spring, comes into contact with a curved stop. The same purpose can be achieved using a straight stop and a curved spring, or some other disposition with non-linear effect, or a non-linear spring.

FIG. 12 shows for example how on an uncorrected indication curve U, like in FIG. 4a, with a two-stage linear correction, six remaining variations $f_1$ to $f_6$ can be obtained, which are ten times smaller than $F_1$ or $F_2$. Those remaining variations would cover only ¼ of the width of the tolerance field (T in FIG. 4) admitted by the official rules.

FIG. 13 shows how, on an uncorrected indication curve U (the same one as in FIG. 12), with a single-stage correction, four remaining variations of approximately the same size as the six remaining variations of FIG. 12 can be obtained. At first a reference line $B_K$ of approximately the same steepness as in FIG. 11 is drawn. Then from the point of action $E_4$, instead of a straight line (G, FIG. 4a) a curve segment $K_k$ with a distinctly smaller curvature than the curvature of the part of curve U on the right of the point of action E is fitted the best possible way over said part of curve U. Besides the two variations $f_7$ and $f_8$ relative to the reference line $B_k$, two further variations $f_9$ and $f_{10}$ are created. They are distinctly smaller than the variations $f_1 - f_4$ in FIG. 4a, with single step linear correction. They correspond approximately to the variations shown in FIG. 12 with two stage linear correction.

In the embodiments shown in FIGS. 5,6,8,9,10 and 11, the linearizing springs have been represented fixed to the beam and the stop fixed to the frame. Of course the, stop and spring can be exchanged. Furthermore, the stop or spring could be mounted, instead of on the beam itself, on an additional element moved by the beam. This is particularly advantageous when the beam, the load-compensating means or the load support make only a very small movement, because a certain multiplication of this movement is achievable by the additional element. Instead of on the beam or on an additional element, the linearizing spring and/or the stop may also be mounted on other existing elements of the device, e.g. on the load support.

Furthermore, in the exemplifying embodiments only linearization has been treated. Of course, with the same means also a distortion is possible, as far as it may be desirable for some reasons. It has no importance whether the indication is analogue or digital.

Linearizing springs have not necessarily to be springs with linear effect. It is difficult, as mentioned before, to produce springs with non-linear effect which compensate exactly defined linearity errors over the whole measuring range. This procedure fails specially in the case of serial production of instruments, where errors diverge considerably, so that for each case different suitable springs would have to be produced.

On the contrary, in the embodiments described the manufacture of these springs is considerably facilitated, because a precise and individual adaptation of each spring to the non-linearity of the device is not necessary any more. The choice of the points of action and the adjustment of the characteristic line of the spring permit to obtain an exact correction during the adjustment.

I claim:

1. In a mass and force measuring instrument comprising a load support, load-compensating means with very small travel, transmission elements transmitting a force depending on the load to the load-compensating means, display means, at least one pair of linearizing springs whose forces vary continuously and act on the load-compensating means in a direction parallel to that of said force depending on the load, said linearizing springs being active each only in a different part of the measuring range.

2. In a mass and force measuring instrument comprising a load support, load-compensating means with very small travel, transmission elements transmitting a force depending on the load to the load-compensating means, display means, at least one linearizing spring whose force varies continuously and acts on the load-compensating means in a direction parallel to that of said force depending on the load, said linearizing spring being active only in a part of the measuring range, and at least one adjustable stop for said spring, setting the part of the measuring range in which said spring is active.

3. In a mass and force measuring instrument comprising a load support, load-compensating means with very small travel, transmission elements transmitting a force depending on the load to the load-compensating means, display means, at least one linearizing spring whose force varies continuously and acts on the load-compensating means in a direction parallel to that of said force depending on the load, said linearizing spring being active only in a part of the measuring range and means to adjust the characteristic line of said spring.

4. In a mass and force measuring instrument comprising a load support, load-compensating means with very small travel, transmision elements transmitting a force depending on the load to the load-compensating means, display means, at least one linearizing spring whose force varies continuously and acts on the load-compensating means in a direction parallel to that of said force depending on the load, said linearizing spring being active only in a part of the measuring range, an elongated stop in contact with said spring, the point of contact moving as a function of the load.

* * * * *